May 27, 1969  L. L. AZURE, JR  3,445,942
MULTIPLE PRINTOUT TEST GRADING MACHINE
Filed Dec. 16, 1968  Sheet 1 of 3

INVENTOR
LEO L. AZURE, JR.

BY Brufsky and Staas
ATTORNEYS

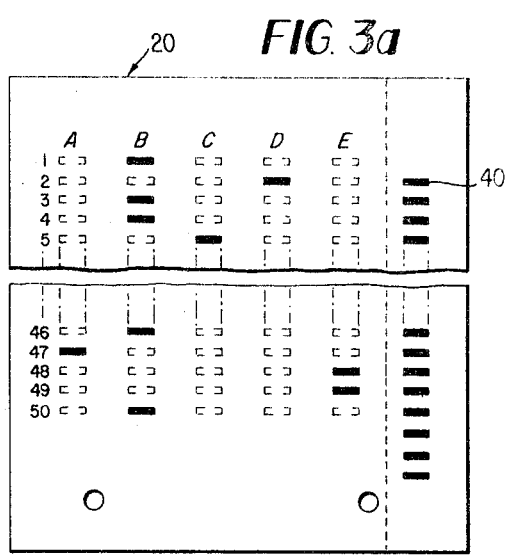
FIG. 3
FIG. 3a
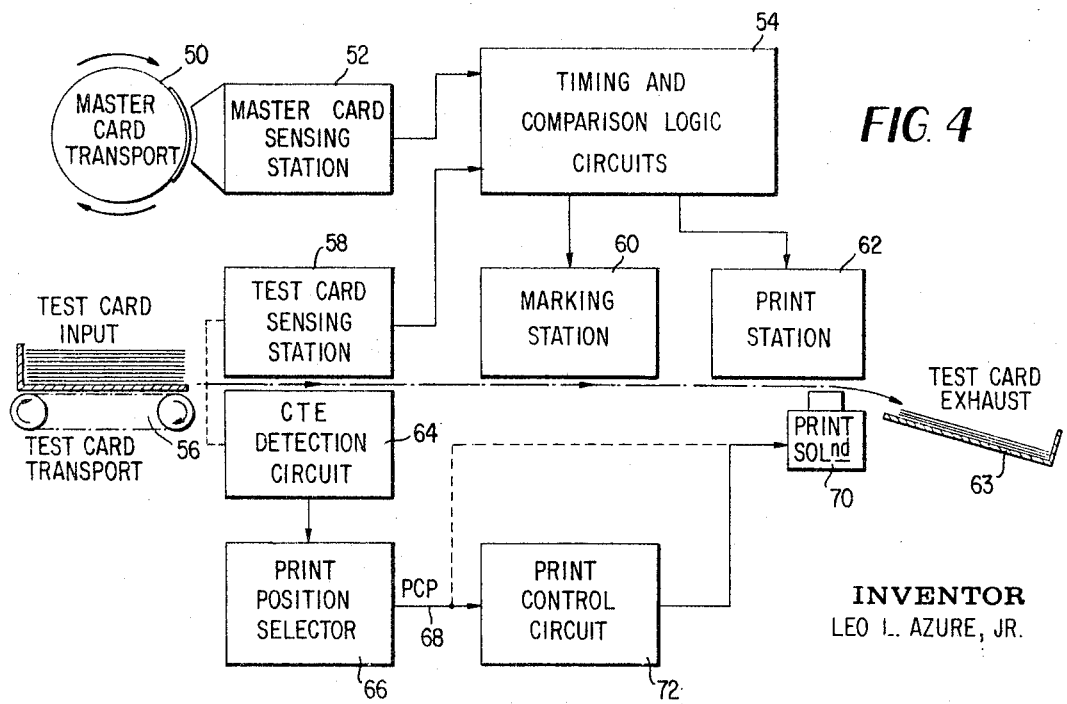
FIG. 4
INVENTOR
LEO L. AZURE, JR.

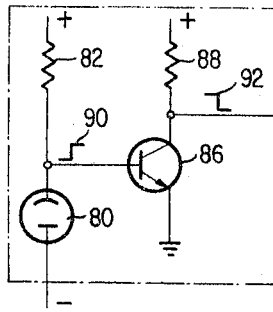
FIG. 5
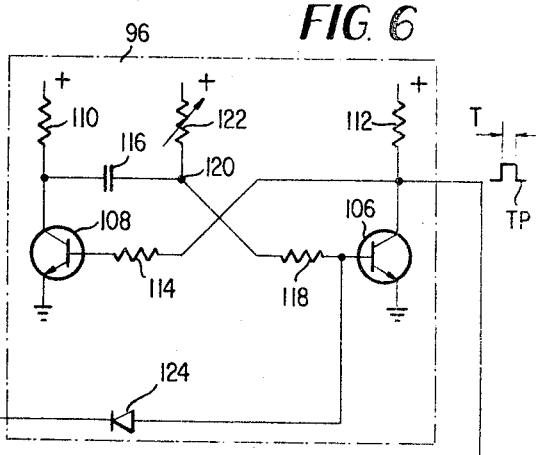
FIG. 6
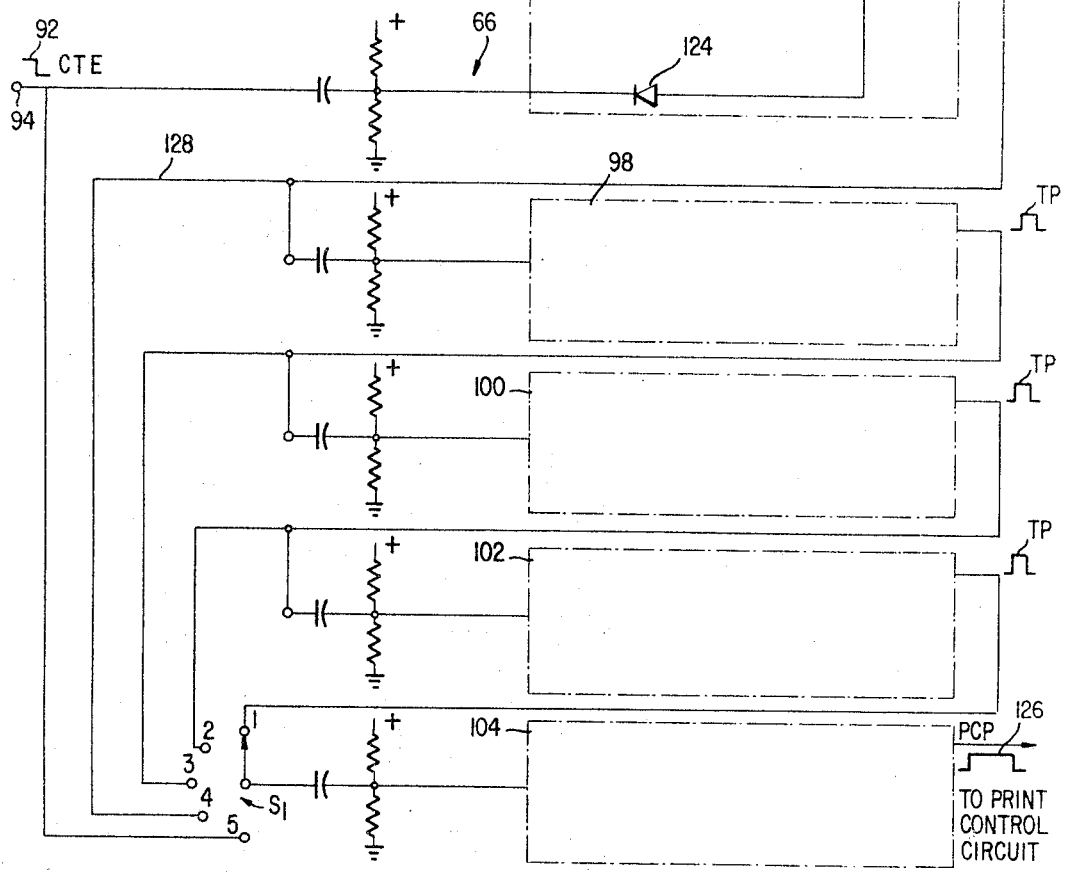
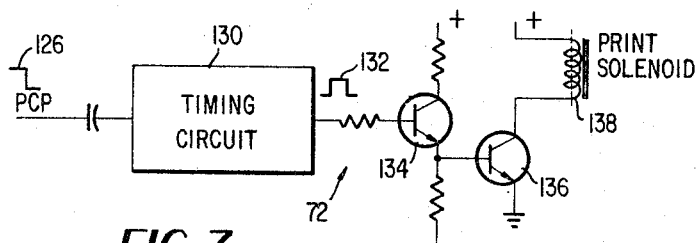
FIG. 7
INVENTOR
LEO L. AZURE, JR.
BY Brufsky and Staas
ATTORNEYS 3,445,942
Patented May 27, 1969

---

3,445,942
MULTIPLE PRINTOUT TEST
GRADING MACHINE
Leo L. Azure, Jr., Richland, Wash., assignor to
Automata Corporation, Richland, Wash.
Filed Dec. 16, 1968, Ser. No. 780,369
Int. Cl. G09b 3/00
U.S. Cl. 35—48                                    13 Claims

ABSTRACT OF THE DISCLOSURE

Apparatus and a method for grading and scoring an answer sheet having indicia applied thereto representing sets of answers to problems of the multiple choice type. Separate total scores for each set of answers are accumulated and printed on the answer sheet in displaced positions after successive grading and scoring operations are performed on each set of answers.

BACKGROUND OF THE INVENTION

Field of the invention

This invention relates to a test grading and scoring apparatus and a method for automatically grading and scoring answer sheets bearing indicia representing answers or responses to problems of the multiple choice answer type. More particularly, this invention relates to an apparatus and method for successively accumulating and printing on an answer sheet, separately identifiable, total scores for different sets of answers provided on the answer sheet.

State of the prior art

Machines for scoring and grading answer sheets to which are applied indicia representing answers to problems of the multiple choice answer type are well known in the prior art. An example of a prior art machine for accomplishing such scoring and grading functions is set forth in U.S. Patent No. 3,284,929 of Leo L. Azure, Jr., entitled "Test Grading Machine" and assigned to the assignee of the present invention.

The test grading machine disclosed therein performs a number of unique functions for correcting answer response sheets of the described type, in an automatic manner and without the necessity of skilled operating personnel. The answer sheets include a group of answer indication areas equal in number to the number of answer choices for each problem of a test. Indicia are applied to the answer indication areas for the problems corresponding to the answer choices believed to be correct for those problems. Correct answers to the problems on the test are registered in a master storage means. Sensing stations are provided for sensing the answer indications provided on the answer response sheets and the answer indications in the master storage means, respectively. A group of answer sheets, such as those prepared by a class of students, are placed in the machine and passed successively, or in sequence, through the answer sheet sensing station. The correct answers provided in the storage means are sensed in timed sequence with the scanning of each answer sheet. Comparison means, including logic circuits, compare the answers derived from the answer sheet sensing station with the correct answers derived from the master storage sensing station for each problem in sequence.

Marking solenoids are positioned in alignment with the columns of answer indication areas on the aswer sheets. The marking solenoids are arranged to be energized in accordance with the correct answer information from the master storage means. In the event that an incorrect answer has been provided on the answer sheet for any given problem, the marking solenoid associated with the answer indication area corresponding to the correct answer for that problem is energized and accordingly marks the answer sheet adjacent this answer indication area. Conversely, for each problem answered correctly, the marking solenoids are inhibited from marking the answer sheet.

The system operation permits great flexibility and versatility in the type and format of the problems, including both the number of answer choices and the number of correct answers for any given total number of answer choices for each problem. These variations do not require any adjustment of the apparatus, but are effected through the simple expedient of providing the appropriate correct answer information in the master storage system. In addition to its simplicity and versatility of operation, the apparatus is fool-proof in operation. For example, if two or more, or all, answer indication areas are marked for any given problem, whereby the answer indication area representing the correct answer, in addition to one or more areas representing incorrect answers, have been marked, the apparatus will automatically grade and score the problem as one answered incorrectly.

The machine of the referenced patent may also include additional apparatus such as totalizing counters which print the total number of correct and the total number of incorrect answers on each answer sheet, and totalizing counters for providing indications of the total number of correct and total number of incorrect responses for an entire group of answer sheets, such as those prepared by all students of a class taking the same examination.

In the pending application of Maurice Edmond Hassfurther and James T. Gates, Ser. No. 621,275 filed Mar. 7, 1967, entitled "Test Grading and Marking Method and Apparatus," assigned to the same assignee as the present invention, there is disclosed an improvement of the test grading and scoring apparatus of the above-cited U.S. Letters Patent No. 3,284,929. This application discloses an apparatus for providing a qualitative evaluation of the frequency of error in answer responses to each of a plurality of problems for an entire group of answer sheets. This qualitative evaluation is achieved through an error marking technique which distinguishes in each answer sheet, problems having correct responses from problems having incorrect or omitted responses.

A marking station is provided which includes a marking device, which when energized, will produce a mark on the answer sheet adjacent a selected longitudinal edge. After a group of answer sheets have been graded and scored, they can be stacked and the edges scanned in order to determine the frequency of error of any particular problem which has been graded.

SUMMARY OF THE INVENTION

The test scoring and grading apparatus and method of the present invention is a further improvement of the apparatus and methods disclosed in both the cited patent and pending application. The invention herein provides for printing out separately identifiable, total scores on an answer sheet corresponding to initial and successive scoring operations of the same answer sheet.

This is accomplished in a preferred embodiment by printing the successive scores in displaced positions on the answer sheet whereby the total scores for each scoring operation are permanently recorded and identifiable. The printout control system utilized in this invention includes means for detecting the trailing edge of the answer sheet as it leaves a sensing station and for generating what is hereinafter referred to as a card trailing edge (CTE) pulse. The CTE pulse is applied to a selective series-parallel arrangement of monostable multivibrators. A switch is set to a position identifying the printout position and thus the scoring operation to which the answer sheet is subjected. This switch selects the appropriate interconnection of multivibrators to provide an appropriate measured time delay from the occurrence of the CTE pulse whereby actuation of the printing counters at the print station occurs at a time to print the score in the appropriate position on the answer sheet for the particular grading and scoring operation.

This multiple printout capability enables both reuse of partially used answer sheets and/or use of completely marked answer sheets in a remedial teaching technique. The correct answers for a predetermined set of answers only may be stored in the master storage facilities to score only the answers to selected sets of answers on an answer sheet regardless of the presence of marks for other problems on the answer sheet, thereby enabling unused portions of the said answer sheet to be used for different tests. Successive uses of the same answer sheet may therefore be individually graded and because of the multiple print out capabilities of the apparatus disclosed in this invention, a separately identifiable score for each test can be printed on the answer sheet. Similarly, the same answer sheet may be remarked by a student after an initial grading and scoring of his answers. The remarked answer sheet with the student's attempt to correct initially incorrect answers may be again passed through the apparatus and regraded to see whether the student has benefited from knowledge that his original answer to a particular problem was incorrect. Once more, because of the multiple printout capabilities of the apparatus, a second grading and scoring, which is separately identifiable, can be made and indicated on the same answer response sheet. In this manner, the apparatus is capable of being used as a remedial teaching tool.

These and other advantages of the invention will become more apparent from the following specification and claims, and from the following drawings.

BRIEF DESCRIPTION OF THE DRAWINGS

FIGS. 1 and 1a show, partially, an answer sheet and a master sheet, respectively, suitable for use with the apparatus of the present invention;

FIGS. 2 and 2a show the same answer sheet and master response sheet illustrated in FIGS. 1 and 1a after they have been used to record responses to different sets of individually graded answers;

FIGS. 3 and 3a show an answer sheet and a master sheet similar to that illustrated in FIGS. 1 and 1a, but which have been used for remedial teaching;

FIG. 4 is a block diagram representing the basic component systems of the apparatus of the present invention;

FIG. 5 shows a schematic diagram of a circuit for sensing the trailing edge of an answer sheet graded by the apparatus of the present invention and for generating an electric signal in response thereto;

FIG. 6 is a schematic diagram of an electric circuit used to selectively delay the signal generated by the circuit of FIG. 5 before it reaches a print station to render the print station operable; and FIG. 7 is a schematic diagram of an electric circuit which can be used for shaping the delayed card trailing edge (CTE) pulse.

DETAILED DESCRIPTION OF THE PREFERRED EMBODIMENT

Referring now to the drawings wherein like numerals indicate like elements throughout the several views there is shown in FIGS. 1 and 1a, respectively, a test card or answer sheet 10 and a master card or sheet 20 suitable for use with the apparatus of the present invention. Each of the cards 10 and 20 include a plurality of answer indication areas arranged in vertical or longitudinally aligned columns A through E and aligned laterally in groups numbered, for example, 1 through 50. The group numbering may correspond to the numbering of a plurality of problems of a test with which the cards 10 and 20 are employed. The problems of this type of test are of the multiple choice answer type and typically may have two or more such multiple choice answers for each problem. The answer indication areas of the columns A through E of each group correspond to such multiple choice answers. The test may include problems requiring true or false answers which may be understood to comprise a choice of one out of two possible answer choices. Columns A and B may be employed for all problems having true or false responses, and are so labelled. Any two columns, if desired, may be so employed.

Each answer indication area of the cards 10 and 20 is defined by a set of brackets within which the answer indicia is to be applied in approximate conformity therewith. The height of each indicia thus defined, in the longitudinal dimension of the cards, is less than that of the corresponding heights of timing marks 30 and 40 provided along one longitudinal edge of the test and master cards, respectively. The answer indication areas and corresponding timing marks for each problem are aligned along a common lateral axis, with the axes displaced in equal amounts for successive problems. Ideally, the answer indicia is confined to the area defined by the brackets. To satisfy the requirements of operation of the apparatus of the invention, however, it is only necessary that at least some portion of the answer indicia overlap, in a longitudinal direction, either the upper or lower edge of the corresponding timing mark.

The top portion of the answer sheet or test card 10 includes suitably labelled spaces for identification of the student, and a plurality of score indication areas 12, 14, 16, . . ., depending upon the number of different sets of answer responses which are to be recorded by students on each card 10. The total right and total wrong responses for each different set of answers indicated on test card 10 will be automatically printed in seriatam in one of the scoring areas 12, 14, 16, . . ., upon the successive completion and grading of each different set of answers appearing on the test card 10.

An error mark 18 is also applied to a marking region 19 of the test card 10 adjacent the left longitudinal edge thereof, for each problem for which the response is incorrect or omitted. For these same problems, a correct answer mark 21 may or may not be applied to the test card 10 adjacent the answer indication area representing a correct response, depending upon whether the test card 10 will be used for remedial teaching purposes or not. As discussed heretofore, the marks 18 provide a qualitative evaluation of the frequency of error of responses to any given problem for an entire group of test cards 10, and also immediately indicate the problems answered erroneously on each test card. The marks 21 indicate the correct answers for each problem having incorrect or omitted responses.

FIGS. 2 and 2a illustrate the manner in which the test card 10 and master card 20 are used when it is desired to use the same test card for a number of different tests; the different tests having different sets of answers which are separately graded and scored.

As mentioned heretofore, the absence of any answer indicia on the master card 20 causes the apparatus to ignore any answer indicia provided for that problem on a test card 10, both as to effecting any marking on the test card 10 and as to accumulating any score, either right or wrong, for that problem.

The test cards 10 typically are of standard size and provide for a predetermined number of problems; for example, 50 problems may be answered on the illustrated card 10. An examination of 10 problems would require only use of the first 10 horizontal rows of answer indication areas. By leaving blank all areas A–E of problems 11–50 on the master card 20, the card 10 may be graded for only 10 problems, the responses to which are provided in the numbered rows 1 to 10. Thereafter, the test card 10 may be employed again for additional examinations by using the remaining ones of the previously unused answer indications from 11 to 50. A master card 20 containing correct answer indicia in the proper columns of only these newly selected rows then is employed for grading and marking.

In the example of FIGS. 2 and 2a, the test card 10 has been used for five examinations or for grading five different sets of answers. As illustrated therein, the first examination included five questions, the second, ten questions, the third, twenty questions, the fourth, ten questions, and the fifth, five questions. The first five indication areas were used by a student to indicate his answer responses and the accumulated right and wrong totals were printed in the scoring space on test card 10 indicated by the numeral 12. Similarly, the right-wrong total was printed on the same test card 10 in spaces 14, 16, . . ., for successive uses of the test card 10.

FIG. 2a illustrates a master card 20 which has been programmed to grade and score only the last five indication areas appearing on test card 10. In other words, although all of the answer indication areas have been filled on test card 10, if the apparatus is programmed by master card 20 as it appears in FIG. 2a, only the last five answer card indication areas or responses appearing on test card 10 will be graded by the apparatus and the total right and wrong responses which have been accumulated will be printed in the corresponding score indication area, which in this case has been designated by the numeral 22.

FIGS. 3 and 3a illustrate the manner of use of a test card 10 and master card 20 for remedial teaching use. In this application, it is assumed that the complete test card 10 has been filled in by appropriate indicia in each of the fifty rows of answer indication areas. Master card 20 has been programmed with the correct answers to each of the fifty problems. After the card has been graded and scored, the test card will be returned to the student. As illustrated in FIG. 3, score indication area 12 will indicate to the student his score; in the example illustrated, he has a total score of forty correct answers and ten incorrect answers. The incorrect answers will be indicated by marks 18 appearing along the longitudinal error indication area 19.

In this example, the correct answer marking apparatus will be disabled. The student can then attempt to re-answer any of his incorrect responses by erasing a previously incorrect response and replacing it with indicia in another one of the indication areas defined by the brackets A–E corresponding to the particular problem. Master card 20 remains the same and is not changed, as it contains all of the correct answers to each of the fifty problems.

The student can then have his test card 10 regraded. The apparatus is then set to a new print position for the regrading and rescoring operation and a new right and wrong total will be printed in the score indication area designated by the numeral 14. In the example illustrated, of the original ten incorrect responses, half have been corrected. In order to determine which responses are still incorrect, the edge mark 18 during the second scoring operation can be marked with a different color ink or the edge mark may be displaced from the first edge mark by a separate marking device, thereby quickly revealing to the student that an answer is still incorrect. Of course, the procedure could again be repeated until all the answers have been indicated by the apparatus as being correct.

As will be apparent from the following detailed description, the programming capabilities achieved by the provision of answers on a master card enables the remedial teaching use of the apparatus for either completely marked test cards or for test cards in which only a portion of the test card has been marked with answer responses. Thus, the remedial teaching feature may be employed in combination with the reuse feature of the invention.

In the grading operation for remedial teaching, as noted, the correct answer marking means is disabled. If desired, it may be enabled on the last of the successive grading operations.

The error marking, in addition to providing qualitative analysis of the grading results for a group of test cards, also provides an indication of correct and incorrect responses on a given card. As noted, various techniques may be employed for providing separate identifiable indicia in successive grading operations on a given answer sheet for indicating correct and incorrect responses. For maximum efficiency and convenience, however, it is preferred to provide a printout of total correct and incorrect responses in each set of answers indicated on a test card, for which the apparatus is programmed by the master card to be graded.

FIG. 4 is a block diagram illustrating the operation of the apparatus for grading and scoring the test cards 10 as described above.

In FIG. 4, a master card 20 containing the correct answer indications for selected problems is mounted on a suitable master card transport 50 which typically may comprise a drum. The correct answer indications are sensed in succession as the drum rotates and transports the master card past the master card sensing station 52. The timing marks 40 and the correct answers detected by the master card sensing station 52 are supplied to timing and comparison logic circuits 54.

The test cards 10 are transported, in sequence, by a test card transport 56 past a test card sensing station 58 which includes an array of sensing elements for sensing the timing marks 30 and the answer indicia of the test cards and supplies signals representative of the detected marks and indicia to the timing and comparison logic circuit 54.

The test cards are transported at a constant rate in the path indicated by the arrows past a marking station 60 and a print station 62 and ultimately are ejected through a test card exhaust 63.

The comparison logic circuits 54 compare the answers sensed from each test card 10 with the correct answers sensed from the master card 20 to determine whether the test card answers are right or wrong. The logic circuits also detect the presence of multiple answer indicia for a given problem to produce a wrong answer output and also detect the occurrence of an omitted answer for a problem for which an answer should have been provided in accordance with the programming of the master card. The omitted answers, however, are not counted as right or wrong, as noted previously.

The marking station 60 may include both an error mark device and a plurality of correct answer marking devices. The timing circuits determine when the answer indication area of a test card is positioned under the marking device of the marking station 60 and the comparison logic circuits determine the marking to be accomplished at the marking station. For each incorrectly answered problem, an error mark 18 is provided on the edge of the card as shown in FIGS. 1 through 3. In addition, the correct answer mark 21 may also be provided for each incorrectly answered problem as shown in FIGS. 1 and 2. As discussed herebefore, however, in the remedial teaching use of the machine, the correct answer marking device may be disabled during successive scoring of the test cards and, if desired, may be enabled during the last of these successive scoring in the remedial teaching operation. If the answer indicia are correct, no marking on the test card is effected.

The print station 62 includes two printing counters, one which accumulates the indications from the comparison circuit of correct answers and one which accumulates indications from the comparison circuits of incorrect answers for each test card.

The sensing stations 52, 58, the timing and comparison logic circuits 54, marking station 60 and print station 62 form no part of the instant invention. The circuits therefor and their operation are described in detail in U.S. application Ser. No. 621,275 and U.S. Patent No. 3,284,929 and are incorporated by reference herein.

A detection circuit 64 (FIG. 5) which detects the trailing edge of the test card 10 as it passes along the above-described path (labelled CTE detection circuit for card trailing edge) supplies a signal to the print position selector 66 as the trailing edge of the card is detected. The print position selector 66 is adjustable to determine the position on the test card 10 at which the count accumulation of the printing counters of the print station 62 is to be imprinted on the test card. Thus, with reference to FIG. 1, for the first scoring of the test card 10, the selector is adjusted to effect total printout in the score indication area labelled 12, for the second scoring, in score indication area labelled 14, etc. The print position selector 66 produces an output pulse on the line 68 labelled PCP (for print control pulse) which is delayed in time by an amount corresponding to the time required for transporting of the test card 10 from the sensing station 58 and CTE detection circuit 64 to a position beneath print station 62 at which the appropriate scoring area is presented to the printing counters.

The PCP pulse may thereby directly energize the print solenoid 70 which actuates a platent to force the card 10 against the printing wheels of the counters to imprint the total accumulated scores in the appropriate scoring area of the test card 10.

A print control circuit 72 (FIG. 7) may be provided, if desired, to shape the pulse supplied to the print solenoid 70 to assure proper energization of the solenoid in both amplitude of the energizing current and its duration to effect a clear printout of the total scores.

FIG. 5 shows a schematic of a circuit suitable for employment as the CTE detection circuit 64. This circuit includes a photosensitive device such as a photocell 80 connected in series with a resistor 82 between a positive power supply terminal and a negative power supply terminal. The series junction of the resistor and photocell is connected to the base of an amplifying and inverting transistor 86, the emitter terminal of which is connected to ground and the collector terminal of which is connected through load resistor 88 to the positive power supply terminal. The photocell 80 is normally non-conductive in the absence of a test card passing through the sensing station 58 and is rendered conductive in the presence of a test card at the sensing station. When conductive, the series junction is thereby effectively grounded and the transistor 86 is non-conductive, thereby maintaining a high positive potential at its collector terminal. When the trailing edge of a test card 10 passes, the photocell 80 reverts to a normal non-conductive state, producing a positive potential at the series junction, as represented by the waveform 90 illustrated thereat, and rendering the transistor 86 conductive whereby the collector terminal thereof is effectively clamped to ground potential. The resultant negative pulse produced at the collector terminal and represented by the waveform 92 there illustrated provides the CTE output pulse 94.

FIG. 6 shows a schematic electric circuit of the print position selector 66. As described, this selector enables selection of the scoring area of the test card 10 at which a total score is to be printed during each of the successive scorings of a given test card. The selection means may comprise a switch schematically indicated as rotary switch S1 having five positions corresponding to five score areas on the test card 10. The CTE pulse 92 is applied to the input terminal 94 and coupled through conventional coupling circuits to each of a plurality of monstable multivibrators 96, 98, 100, 102, and 104. Each of the monstable multivibrators 96 through 104 may be of identical construction and therefore only the schematic for the circuit 96 is presented. The multivibrator 96 includes a normally conducting transistor 106 and a normally nonconducting transistor 108 each connected in a grounded emitter configuration with the collector terminals thereof connected through corresponding load resistors 110, 112 to positive power supply terminals. The collector terminal of transistor 106 is further connected through a resistor 114 to the base of transistor 108 and the collector terminal of transistor 108 is connected through a capacitor 116 and a resistor 118 to the base of transistor 106. The junction 120 of the resistor 118 and capacitor 116 is further connected through a variable resistor 122 to the positive power supply terminal. The variable resistor 122 and the capacitor 116 form an adjustable RC timing circuit which determines the resetting time of the monostable multivibrator 96.

In operation, the negative going CTE pulse 92 operates through a diode 124 to clamp the base terminal of normally conducting transistor 106 to ground thereby terminating its conduction. The resultant positive going pulse produced at the collector terminal thereby renders transistor 108 conducting and produces the positive going leading edge of the timing pulse TP. The series RC timing circuit of variable resistor 122 and capacitor 116 is now charged through the conducting collector-emitter path of transistor 108 at a rate depending on the value of resistor 122. The voltage across capacitor 116 becomes sufficiently positive to cause transistor 106 to conduct and thereby to terminate the conduction of transistor 108. This return to the normal conducting condition produces the trailing edge of the pulse TP which is thereby of a total duration accurately controlled by the RC circuit of the multivibrators.

As is apparent, an initial time period is required for a test card 10 to pass through the sensing station 58 and for the trailing edge detected by the CTE detection circuit 64, and the arrival of the score area of that test card at the print station 62. Since the cards are graded from the last problem to the first, the first total score area to be presented at the print station is that labelled 5, corresponding to the last successive scoring of the card.

Delayed actuation of the print station for printout in the scoring area 5, corresponding to this initial time period, is effected by the multivibrator 104. The reset of this multivibrator 104 is adjusted so that the output, print control pulse PCP is of a delay equal to the initial time period. When the selector switch S1 is set to position 5, the CTE pulse is applied directly to the multivibrator 104 and causes it to set, producing the leading edge of the pulse PCP. The automatic reset of multivibrator 104 and the control time period thereafter produces the trailing edge of that pulse which thereby defines the period of actuation of the print station.

Printout in successive ones of the score areas 4, 3, 2, and 1 now requires only incremental additional time delays. This function is performed by switching in, in series, successive ones of the multivibrators 96, 98, 100, and 102, each of which produces an identical timing pulse output TP each of a duration corresponding to the incremental time delay for printout in each of the successive score areas.

For example, selector switch S1 is set to position 4 to effect printout in score area 4. The input of multivibrator 104 is now connected through switch S1 at position 4 to line 128 connected to the output of multivibrator 96. The trailing edge of the timing pulse output TP of multivibrator 96 is now employed to set the multivibrator 104, whereby the incremental time delay of that pulse TP is added to the delay effect by the pulse PCP, the trailing edge of which as before defines the time of actuation of the print station. In a similar manner, the successive positions 3, 2, and 1 of the switch S1 introduce the delays afforded by the timing pulse TP outputs of the multivibrators 98, 100, and 102, respectively, for effecting a total delay for printout in the score areas 3, 2, and 1, respectively.

As noted previously, a print control circuit 72 may be provided for shaping the print control pulse 126 employed for energization of the print solenoid 70. As will be apparent, the trailing edge of the print control pulse 126 determines the time of energization of the print solenoid 70.

FIG. 7 shows a suitable print control circuit 72 for effecting this pulse shaping and associated driving circuits for the print solenoid 70. The print control pulse 126 is capacitively coupled to a timing circuit 130 which may comprise a monostable multivibrator of the types shown in FIG. 6. The trailing edge of the pulse 126 triggers the timing circuit 130 which, in a preset time delay, returns to its normal condition. The resultant square wave output pulse 132 is applied to the base of an emitter follower-connected transistor 134, the output of which is supplied to a power transistor 136. The energizing coil 138 of the print solenoid 70 is connected in series circuit with the collector-emitter path of the transistor 136. The output square wave pulse 132 from the timing circuit thus assures a period of conduction of transistors 134 and 136 and thus a period of energization of the print solenoid 70 sufficient to effect a clear and accurately positioned printout of the total scores in the selected scoring areas of the test card 10.

What is claimed is:

1. Apparatus for selectively grading sets of answers indicated on each of a plurality of answer sheets, each set of answers being selectively and individually graded for each of the plurality of answer sheets and successive sets of answers being graded in succession, and wherein each set of answers is provided in response to a corresponding set of problems of the multiple choice type, comprising:
    means for selecting a set of answers to be graded and for providing the correct answers to the selected set, in succession for all sets of answers,
    means for sensing the answers indicated on each of the plurality of answer sheets,
    means responsive to said sensing means and to said selecting means for comparing the answers of a selected set sensed from each of the plurality of answer sheets with the correct answers for that selected set of each successively selected set of answers,
    means responsive to said comparison means for determining a score for each selected set of answers and for printing an indication of that score on each answer sheet of the plurality thereof, for each successively selected set of answers, and
    electric circuit means for selectively controlling the time at which said printing means is rendered operable for printing separately identifiable score indications on each of said answer sheets at spaced locations thereon, each set of answers having one of said locations respectively associated therewith and the score indication therefor printed in that associated location for separately identifying that score indication with the corresponding set of answers.

2. Apparatus in accordance with claim 1 wherein said selecting means selects, for grading, the next successive set of answers on each answer sheet of the plurality thereof, which next successive set of answers corresponds to reuse of the answer sheets, subsequently to grading and scoring of each preceding set of answers indicated thereon, in a different unused portion thereof for indicating answers to a different, corresponding set of problems.

3. Apparatus in accordance with claim 1 wherein said selecting means selects, for grading, the next successive set of answers on each answer sheet of the plurality thereof, which next successive set of answers corresponds to reuse of the answer sheets, subsequently to grading and scoring of each preceding set of answers indicated thereon in at least the same portion thereof for indicating new answers to problems of that same set for which incorrect answers were indicated in a preceding grading.

4. Apparatus in accordance with claim 1 wherein said last-named means includes:
    means for accumulating the total number of correct and the total number of incorrect responses in each set of answers for each of the plurality of answer sheets during each successive operation of said comparing means for the successively selected sets of answers, and
    means for substantially simultaneously printing each of said accumulated totals on each of said answer sheets of the plurality thereof at spaced locations thereon corresponding to the successively selected and graded sets of answers.

5. Apparatus in accordance with claim 1 wherein said electric circuit control means includes:
    means for sensing a position on each answer sheet of the plurality thereof and generating an electrical signal in response thereto, and
    means for supplying said electrical signal to said printing means to render said printing means operable, said signal supplying means including:
    means for selectively delaying the time at which said electrical signal is supplied to said printing means to render said printing means operable to print said score indications at a predetermined one of said locations on each answer sheet of the plurality thereof, respectively associated with each set of answers, for the successively selected sets of answers.

6. Apparatus in accordance with claim 1 having means for effecting relative movement of each of said answer sheets of the plurality thereof, in succession, and of said answer sensing means and said printing means, wherein there is further provided:
    means at said answer sensing means for sensing a position on said answer sheet to generate a timing signal, and
    control means responsive to said timing signal for generating a print control signal a predetermined time thereafter to render said printing means operable to print said score indications at a predetermined one of said loccations on each answer sheet of the plurality thereof respectively associated with each set of answers, for the successively selected sets of answers.

7. Apparatus in accordance with claim 6 wherein said position sensing means senses the trailing edge of each answer sheet for generating said timing signal.

8. Apparatus in accordance with claim 6 wherein said control means further includes means for generating said print control signal at a selected one of a plurality of predetermined times after said timing signal to render said printing means operable to print said score indications at a corresponding one of a plurality of predetermined locations on said answer sheet.

9. Apparatus in accordance with claim 8 wherein said control means comprises:
    a selector switch, and
    a plurality of monostable multivibrators adapted to be selectively connected in series by said switch.

10. Apparatus in accordance with claim 9 wherein:
    one of said monostable multivibrators is responsive to an input signal to generate a print control signal a predetermined time thereafter corresponding to the time for movement of said answer sheet from said answer sensing means to present a first of said predetermined locations thereof at said printing means,
    each of the other monostable multivibrators is responsive to an input signal to generate an output signal a predetermined incremental time thereafter corresponding to the incremental time for movement of said answer sheet to present successive ones of said predetermined locations thereof to said printing means, and
    said switch enables selective connection to said position sensing means of said one multivibrator to receive said timing signal as said input signal, and of one or more of said other multivibrators in series with said one multivibrator to receive said timing signal as said input signal for the first of said series connected multivibrators and to receive said output signal of a preceding multivibrator as the input signal for each succeeding series connected multivibrator to render said printing means operable to print said score indications at corresponding ones of said predetermined locations on said answer sheet.

11. Apparatus in accordance with claim 1 wherein said means for selecting the set of answers to be graded and for providing the correct answers to the selected set comprises:
a master sheet substantially identical to the answer sheets and providing for indicating thereon a set of correct answers to a corresponding set of problems, and
means for sensing the correct answers of the set indicated on the master sheet for supplying said comparing means with the correct answers for that set and for causing said comparing means to respond only to the set of answers sensed from each of the plurality of answer sheets which correspond to the set of correct answers indicated on the master sheet, and wherein:
said score indication means prints a score, comprising the total number of correct answers indicated in a given set of answers on each of the plurality of answer sheets in accordance with comparison thereof with the set of correct answers indicated on the master sheet, in a location on each answer sheet corresponding to and separately identifiable with the set of answers for which correct answers are provided on the master sheet.

12. Apparatus in accordance with claim 11 wherein there are provided a plurality of said master sheets, each of said master sheets having indicated thereon a different set of correct answers to corresponding, different sets of problems, and wherein:
each successive set of answers on each answer sheet of the plurality thereof corresponds to reuse of that answer sheet, subsequently to grading and scoring of each preceding set of answers indicated thereon in response to a corresponding set of problems, in a different unused portion thereof for indicating answers to a different, corresponding set of problems.

13. Apparatus in accordance with claim 11 wherein:
said means for selecting the set of answers to be graded and for providing the correct answers to the selected set comprises a single master sheet having indicated thereon a set of correct answers to a corresponding set of problems, and wherein
each next successive set of answers on each answer sheet of the plurality thereof corresponds to reuse of that answer sheet, subsequently to grading and scoring of the next preceding set of answers indicated thereon in a corresponding portion of the answer sheet, in at least that same corresponding portion thereof for indicating new answer choices to problems of that same set for which incorrect answers were indicated in a preceding grading.

References Cited

UNITED STATES PATENTS

| | | | |
|---|---|---|---|
| 2,817,480 | 12/1957 | Baldwin | 235—61.7 |
| 2,944,734 | 7/1960 | Martin | 35—48.2 |
| 3,050,248 | 8/1962 | Lindquist | 35—48.2 |
| 3,176,415 | 4/1965 | Leathers | 35—48.2 |
| 3,267,258 | 8/1966 | Bene | 35—48.2 |
| 3,284,929 | 11/1966 | Azure | 35—48.2 |
| 3,294,956 | 12/1966 | Jenkins et al. | 235—61.9 |
| 3,308,273 | 3/1967 | Turner | 235—61.9 |
| 3,408,482 | 10/1968 | Busby | 235—61.7 |
| 3,412,484 | 11/1968 | Evans et al. | 35—48.2 |

EUGENE R. CAPOZIO, *Primary Examiner.*

W. W. NIELSEN, *Assistant Examiner.*

PO-1050
(5/69)

UNITED STATES PATENT OFFICE
CERTIFICATE OF CORRECTION

Patent No. 3,445,942      Dated May 27, 1969

Inventor(s) Leo L. Azure, Jr.

It is certified that error appears in the above-identified patent and that said Letters Patent are hereby corrected as shown below:

In claim 1, column 9, line 41, "of" (first recitation) should be -- for --.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents